US012304662B2

(12) United States Patent
Bogdanov et al.

(10) Patent No.: US 12,304,662 B2
(45) Date of Patent: May 20, 2025

(54) RELEASE APPARATUS

(71) Applicant: EXOLAUNCH GmbH, Berlin (DE)

(72) Inventors: Dmitriy Bogdanov, Berlin (DE); Peter Schwarz, Salzburg (AT); Peter Wimmer, Pfarrwerfen (AT); Johannes Gruber, Salzburg (AT); Sergey Polyak, Berlin (DE); Denis Bederov, Berlin (DE)

(73) Assignee: EXOLAUNCH GmbH, Berlin (DE)

( * ) Notice: Subject to any disclaimer, the term of this patent is extended or adjusted under 35 U.S.C. 154(b) by 426 days.

(21) Appl. No.: 17/668,778

(22) Filed: Feb. 10, 2022

(65) Prior Publication Data

US 2022/0380067 A1 Dec. 1, 2022

(30) Foreign Application Priority Data

May 31, 2021 (EP) .................................... 21176976

(51) Int. Cl.
 *B64G 1/64* (2006.01)
 *B64G 4/00* (2006.01)
(52) U.S. Cl.
 CPC ............... *B64G 4/00* (2013.01); *B64G 1/641* (2013.01); *B64G 1/6457* (2023.08)
(58) Field of Classification Search
 CPC .......... B64G 1/645; B64G 4/00; B64G 1/641; B64G 1/646; B64G 1/222; A63C 9/00; F16B 2/10
 See application file for complete search history.

(56) References Cited

U.S. PATENT DOCUMENTS

| | | | | |
|---|---|---|---|---|
| 4,381,092 A | * | 4/1983 | Barker ................... | B64G 1/646 403/57 |
| 4,682,804 A | * | 7/1987 | Palmer ................... | B64G 1/645 294/82.26 |
| 5,040,748 A | * | 8/1991 | Torre ...................... | B64G 1/641 244/137.4 |
| 5,226,617 A | | 7/1993 | Panin | |
| 6,935,805 B2 | * | 8/2005 | O'Brien ................. | G02B 7/183 294/166 |
| 9,399,295 B2 | * | 7/2016 | Roberts ................ | B25J 19/0091 |
| 9,669,950 B2 | * | 6/2017 | Rembala ................ | B64G 1/222 |
| 10,569,910 B2 | * | 2/2020 | Bogdanov ............. | B64G 1/641 |
| 10,981,281 B2 | * | 4/2021 | Hay ....................... | H01R 13/629 |
| 2005/0232745 A1 | * | 10/2005 | Retat ...................... | B64G 1/645 414/753.1 |
| 2015/0336686 A1 | * | 11/2015 | Nijenhuis ............ | F16M 11/121 410/117 |

FOREIGN PATENT DOCUMENTS

| | | |
|---|---|---|
| CN | 110329552 A | 10/2019 |
| DE | 102016108606 A1 | 11/2017 |
| WO | 2021089167 A1 | 5/2021 |

OTHER PUBLICATIONS

European Patent Office. Extended European Search Report for EP Application No. 21176976.5, mailed Nov. 19, 2021, pp. 1-5.

* cited by examiner

*Primary Examiner* — Medhat Badawi
*Assistant Examiner* — Vicente Rodriguez
(74) *Attorney, Agent, or Firm* — Vivacqua Crane, PLLC

(57) ABSTRACT

A release apparatus for releasing a satellite comprises a release plunger that can be preloaded by a release spring and that is held in a preloaded position by two two-armed pivot levers pivotable about a respective pivot axis, wherein each pivot lever can be held against a force of a spring in a holding position by a release element.

19 Claims, 5 Drawing Sheets

RELEASE APPARATUS

CROSS REFERENCE TO RELATED APPLICATIONS

This application claims the benefit of foreign priority under 35 U.S.C. § 119 of European patent application number 21176976.5, filed May 31, 2021. The contents of this application are incorporated herein by reference in their entirety.

INTRODUCTION

The present invention relates to a release apparatus for releasing a satellite, said release apparatus comprising a release plunger that can be preloaded by a release spring and that is held in a preloaded position by two two-armed pivot levers pivotable about a respective pivot axis, wherein each pivot lever can be held against a force of a spring in a holding position by a release element.

Such a release apparatus is, for example, known from DE 10 2016 108 606 A1 and there serves for the release of holding bolts of a cover to release or eject a satellite. A further release apparatus for releasing a satellite is known from WO 2021/089167 A1. In the apparatus described in this prior art, a satellite fastened to a ring is ejected with the aid of the release apparatus in that the release apparatus releases a spring-loaded pivot bolt.

Release apparatus of the kind described above are usually transported into the orbit by means of carrier rockets and may in so doing be subject to high shock loads under certain circumstances. It is therefore the object of the present invention to provide a release apparatus of the initially named kind that also ensures a proper release in the case of high shock loads.

SUMMARY

This object is satisfied by the features of claim 1 and in particular in that one arm of each pivot lever is provided with an additional weight. With such an additional weight, the mass at both arms of a pivot lever can be set or distributed such that the two-armed pivot lever is subjected to no torque or only an extremely small torque in the event of an impact load or shock load since the torques at both sides of the pivot axis of a pivot lever compensate one another. An accidental release of the release apparatus in the event of impact-like loads can hereby prevented.

Advantageous embodiments of the invention are described in the description, in the drawing, and in the dependent claims.

In accordance with a first advantageous embodiment, a mass and a position of the additional weight can be selected such that a center of gravity of each pivot lever, including all the parts connected to said pivot lever, lies in a region of a pivot axis of said pivot lever. Thus, attachments that, for example, cooperate with the release element can be attached to the pivot lever, for example. If the mass of all the components fixedly connected to the pivot lever, i.e. all the components that pivot together with the pivot lever, is taken into account, the mass and the position of the additional weight at the pivot lever can be selected such that an impact exerted onto the release apparatus or the pivot lever does not cause the pivot lever to rotate in an unwanted manner and to release from the release element.

In accordance with a further advantageous embodiment, the additional weight can comprise tungsten and can in particular consist of tungsten or of a tungsten alloy. Due to the high specific weight, tungsten is particularly easily suitable for the manufacture of the additional weight since this material has an exceptionally high density and thus also makes it possible for the total release apparatus to have a compact design.

In accordance with a further advantageous embodiment, the pivot levers can contact a locking rocker, which is fastened to the release plunger, in the holding position. It can be achieved by such a locking rocker that, after the actuation of a release element, only one of the pivot levers is pivoted, whereupon the locking rocker is no longer held by both pivot levers so that it pivots and thereby enables a displacement of the release plunger. The release plunger can hereby itself be configured as a single-piece component.

In accordance with a further advantageous embodiment, a latch element can be provided that, for example, locks the pivot rocker in a position of rest or in a pivoted position. Such a latch element can, for example, be spring-loaded and can ensure that the pivot rocker is held in its pivoted position after the release and does not pivot back in an unwanted manner by itself, whereby a further locking of the release plunger would be blocked under certain circumstances. Alternatively or additionally, the locking rocker can also latch in in its position of rest in which both pivot levers contact the pivot rocker and hold it symmetrically from two sides so that the release plunger cannot be pressed into the release position by the release spring.

In accordance with a further advantageous embodiment, the release apparatus can be arranged in a closed housing that is provided with a plurality of mechanical indicators that indicate a state of the release apparatus. Thus, an indicator can, for example, be provided that indicates whether the release plunger is in its preloaded position or in its release position in which the release spring has displaced the release plunger. Furthermore, at least one indicator can be provided that indicates the position of a pivot lever to an operator, i.e. that indicates whether the pivot lever is in its preloaded position of rest or in its release position that enabled a displacement of the release plunger.

In accordance with a further advantageous embodiment, at least one indicator can be configured as an actuation element so that a displacement of the release plunger or a pivoting of a pivot lever is, for example, possible due to a manual actuation of the indicator. In this way, the release apparatus can be set by an operator without additional tools so that the release plunger is preloaded by the release spring and the two pivot levers hold the release plunger in its preloaded position.

In accordance with a further advantageous embodiment, the release spring can be accommodated in an indicator so that it is accommodated in a space-saving and protected manner.

In accordance with a further advantageous embodiment, in the preloaded position, the release plunger is acted on by a spring-loaded latch transversely to the longitudinal axis of said release plunger, which has the advantage that the spring force of the latch does not act against the spring force of the release plunger. Since such a spring-loaded latch serves to cause the release of the satellite, such a latch is usually acted on by a high spring force. However, since this spring force extends transversely to the spring force of the release spring in this embodiment, said spring force of the release spring does not first have to be overcome on a release of the apparatus so that smaller springs can be used.

In accordance with a further advantageous embodiment, the release plunger can be guided by a fixed roller that in particular absorbs a force of a spring-loaded latch. It is hereby ensured that the release plunger is not acted on by lateral forces or is subject to undesirable bending in its preloaded position.

In accordance with a further advantageous embodiment, a longitudinal axis of a release element, for example of a holding magnet, can enclose an angle of approximately 15° to 25° with the longitudinal axis of the release plunger. Due to such a relatively small acute angle between the release element and the release plunger, a very compact design can be achieved.

In accordance with a further advantageous embodiment, the release apparatus can be arranged in a closed housing that has a length in parallel with the longitudinal axis of the release plunger and a width transverse to said longitudinal axis and transverse to the pivot axes of the pivot levers, wherein the width is larger and in particular one and a half times to twice as large as the length. A very compact parallelepiped-shaped arrangement, which can be installed at a satellite ejection device in this manner, is hereby achieved such that all the masses are arranged as close as possible to the installation plane, which has a positive effect against an oscillation of the system at low frequencies.

In accordance with a further advantageous embodiment, the release apparatus can be arranged in a closed housing that has an opening into which a tool for an emergency release of a pivot lever can be inserted. Thus, a screwdriver can, for example, be inserted between the release element and a pivot lever that is held by the release element such that the pivot lever can be separated from the release element. In this way, it is not necessary to open the housing or to initiate an electrical or electronic release.

In accordance with a further advantageous embodiment, a latch preloaded by a spring can be provided and can be transferred by the release plunger into a release position, wherein two sensors connected in parallel, in particular two reed contacts, are provided by which the release position of the latch can be detected. Due to such a sensor system, a redundant determination can be made as to whether the release apparatus has been properly released and the latch has moved properly into its release position in which a satellite can be ejected.

BRIEF DESCRIPTION OF THE DRAWINGS

The present invention will be described in the following purely by way of example with reference to an advantageous embodiment and to the enclosed drawings. There are shown.

DETAILED DESCRIPTION

Figure 1:
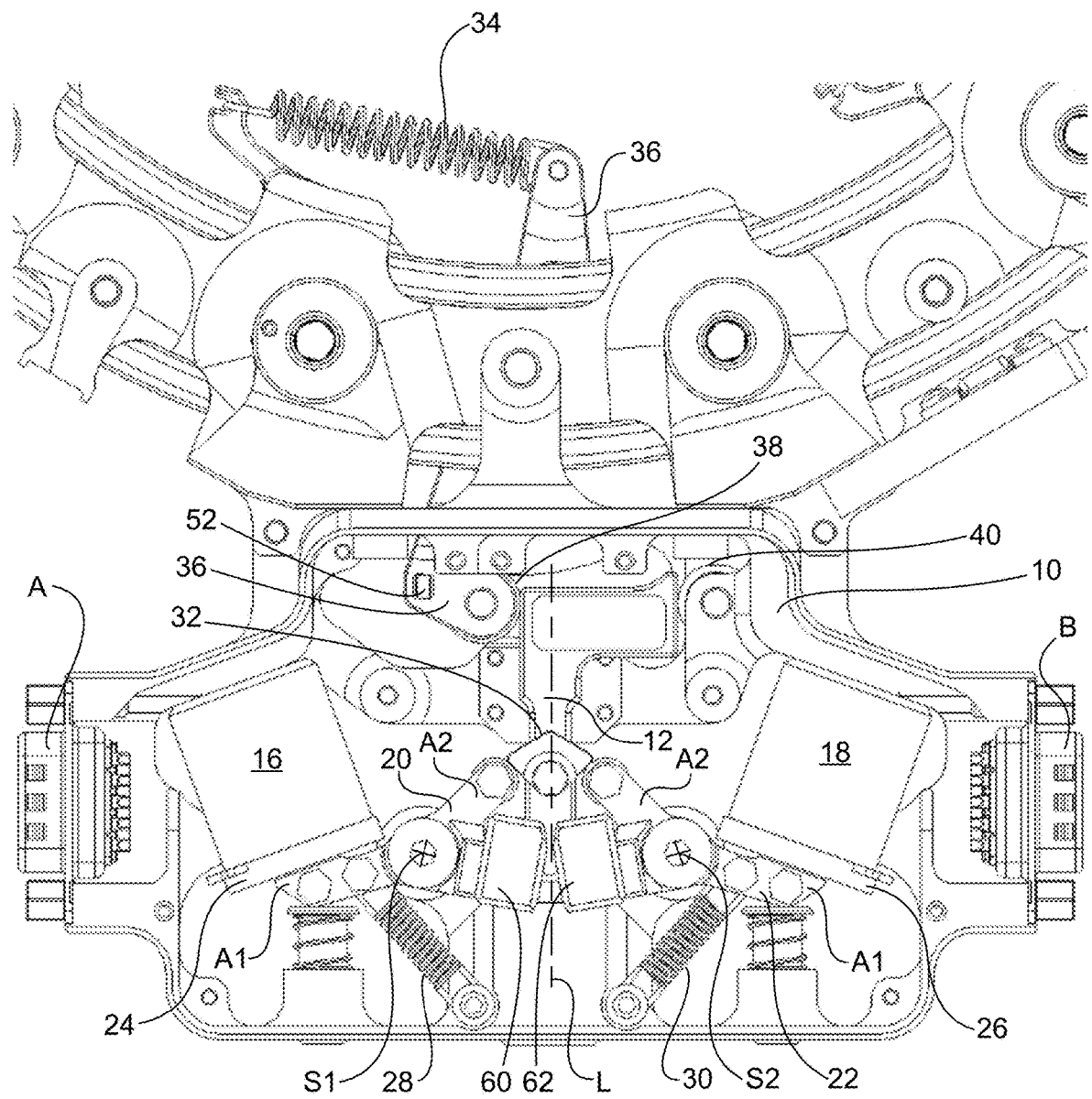
FIG. 1 a plan view of a release apparatus with an open housing and a preloaded release plunger.

FIG. 1 shows a release apparatus for releasing a satellite (not shown), said release apparatus having an approximately parallelepiped-shaped housing 10 that is shown open in the Figures, but can be closed by a cover. In the housing, a linearly displaceable release plunger 12 is located that is pressed into a preloaded position (FIG. 1 and FIG. 3) by a release spring 14 (cf. FIG. 3 and FIG. 4) and that can be displaced into its released position (FIG. 2 and FIG. 4) by the release spring 14.

A respective release element in the form of a magnet 16 and 18 is arranged at both sides of the release plunger 12. The two magnets 16 and 18 are, for example, configured as permanent magnets and can have a magnetic counter-field applied to them by a device, not shown in more detail, for example an electric coil, so that the holding force of the magnet is reduced.

To hold the release plunger 12 in its preloaded position, a two-armed pivot lever 20 and 22 is provided at both sides of the release plunger 12, wherein each pivot lever is pivotable about a pivot axis S1 and S2 extending perpendicular to a longitudinal axis L of the release plunger 12. A contact plate 24, 26, which consists of ferromagnetic material and which is attracted to and held by the associated magnet 16, 18 in the de-energized state, is attached to one arm A1 of each pivot lever 20, 22. Each pivot lever 20, 22 is hereby held against the force of a spring 28, 30 in the holding position shown in FIGS. 1 and 3 in which the release plunger 12 is held in its preloaded position.

For this purpose, the respective other arm A2 of each pivot lever 20, 22 contacts an approximately diamond-shaped locking rocker 32 that is pivotably fastened to the release plunger 12, and indeed about an axis that extends in parallel with the pivot axes S1 and S2.

Figure 2:
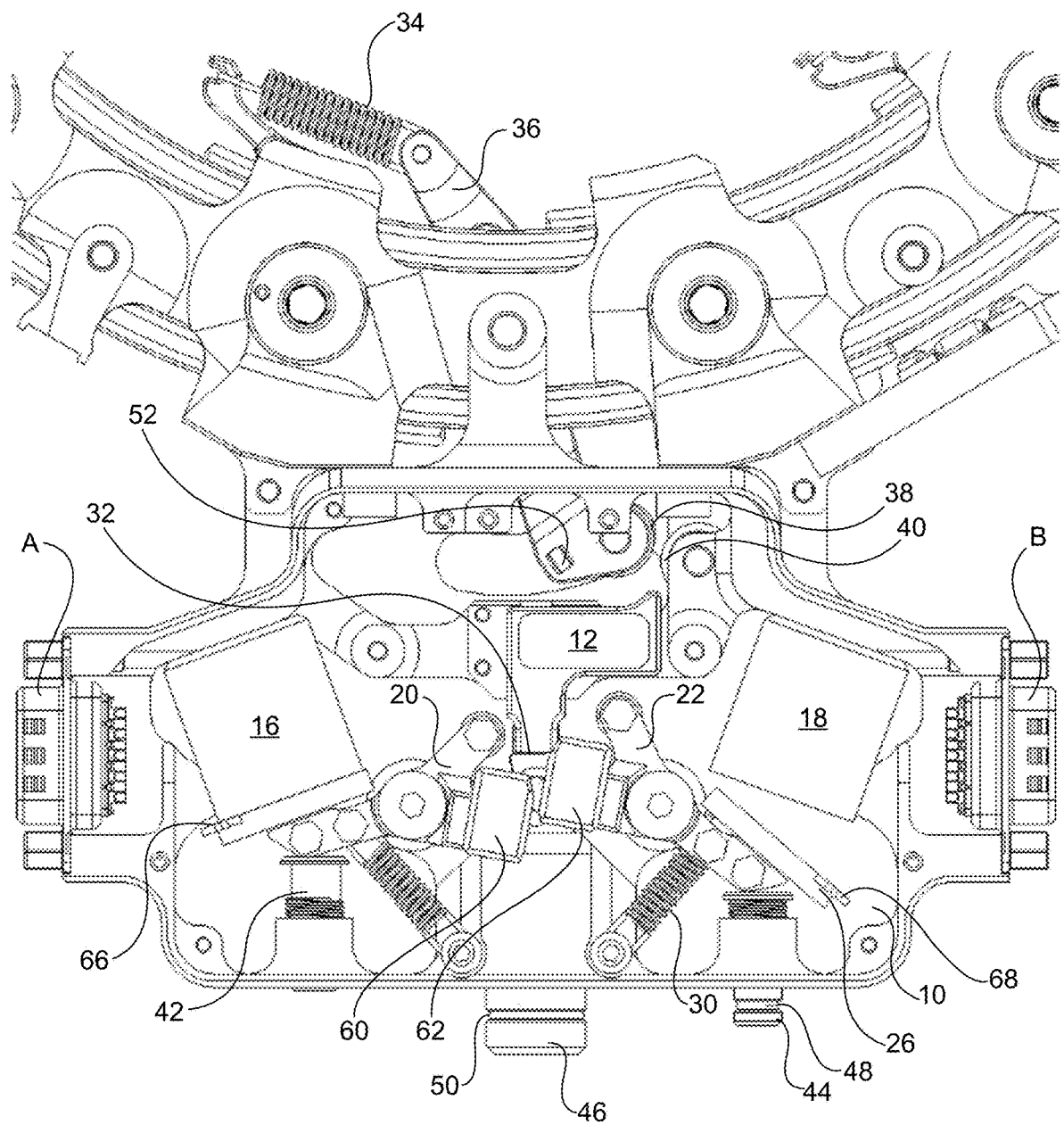
FIG. 2 the release apparatus of FIG. 1 in the released state.
Figure 3:
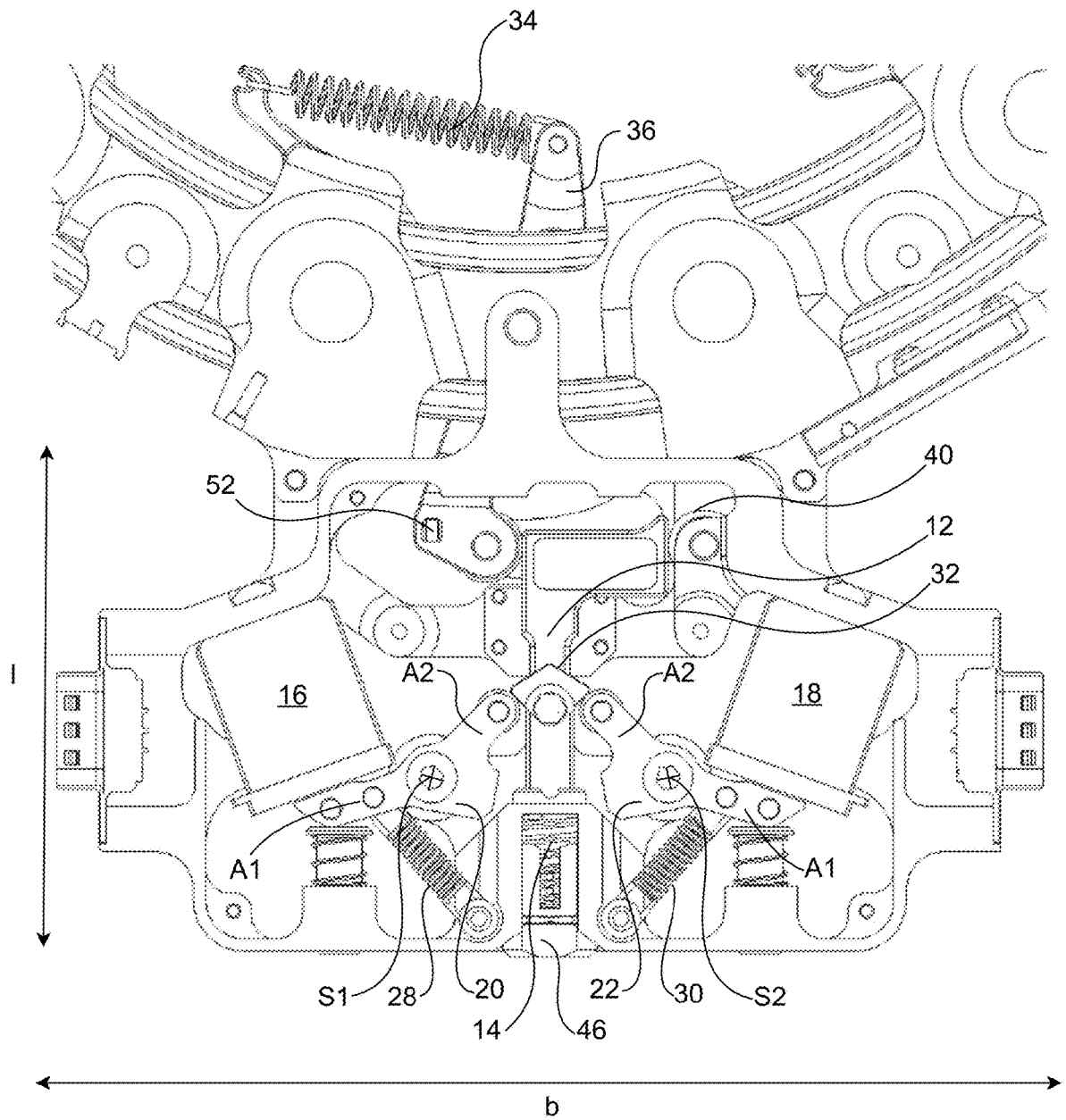
FIG. 3 the apparatus of FIG. 1 in another part sectional representation.

As FIG. 1 and FIG. 3 further illustrate, a pivot bolt 36 loaded by a spring 34 contacts one end of the release plunger 12 and is located in its locked position in FIG. 1 and FIG. 3. When the release plunger 12 has moved downwardly along the longitudinal axis L by the force of the spring 14 in FIG. 1 or FIG. 4, the pivot bolt 36 pivots by the force of the spring 34 into the position shown in FIGS. 2 and 4 and thereby releases a component of a satellite ejection unit (not shown in more detail), such as is described in the initially mentioned prior art.

The contact of the pivot bolt 36 at the release plunger 12 takes place via a roller 38 that is fastened to the pivot bolt 3, that contacts the release plunger 12 in the non-released state, and that exerts a force perpendicular to the longitudinal axis L. To absorb this force, the release plunger 12 is guided by a fixed roller 40 supported in the housing 10 so that no transverse forces are exerted on the release plunger 12.

As a comparison of FIGS. 1 and 2 or FIGS. 3 and 4 shows, the release plunger 12 shifts on the actuation of the release device (downwardly in the Figures) so that the pivot bolt 36 with its roller 38 no longer contacts the release plunger 12, but can pivot pulled by the spring 34, whereby the satellite is released.

In operation, the release apparatus described above is closed by a housing cover, not shown, and electronics provided in the interior of the housing 10 are connected to release electronics via the electrical connectors A and B shown. However, to still be able to recognize the position in which the release plunger 12 and the pivot arms 20 and 22 are located when the housing is closed, a total of three indicators 42, 44, and 46 are provided in the embodiment shown that are simultaneously configured as actuation elements. The indicators 42 to 46 are guided through the housing 10 and are spring-loaded. When the pivot levers 20 and 22 are in their preloaded position (FIG. 1 and FIG. 3) in which the contact plates 24, 26 contact the magnets 16, 18, the indicators 42 and 44 are pushed by their springs in the direction of the housing interior so that they do not project from the housing 10. However, in the released state (cf. FIG.

Figure 4:
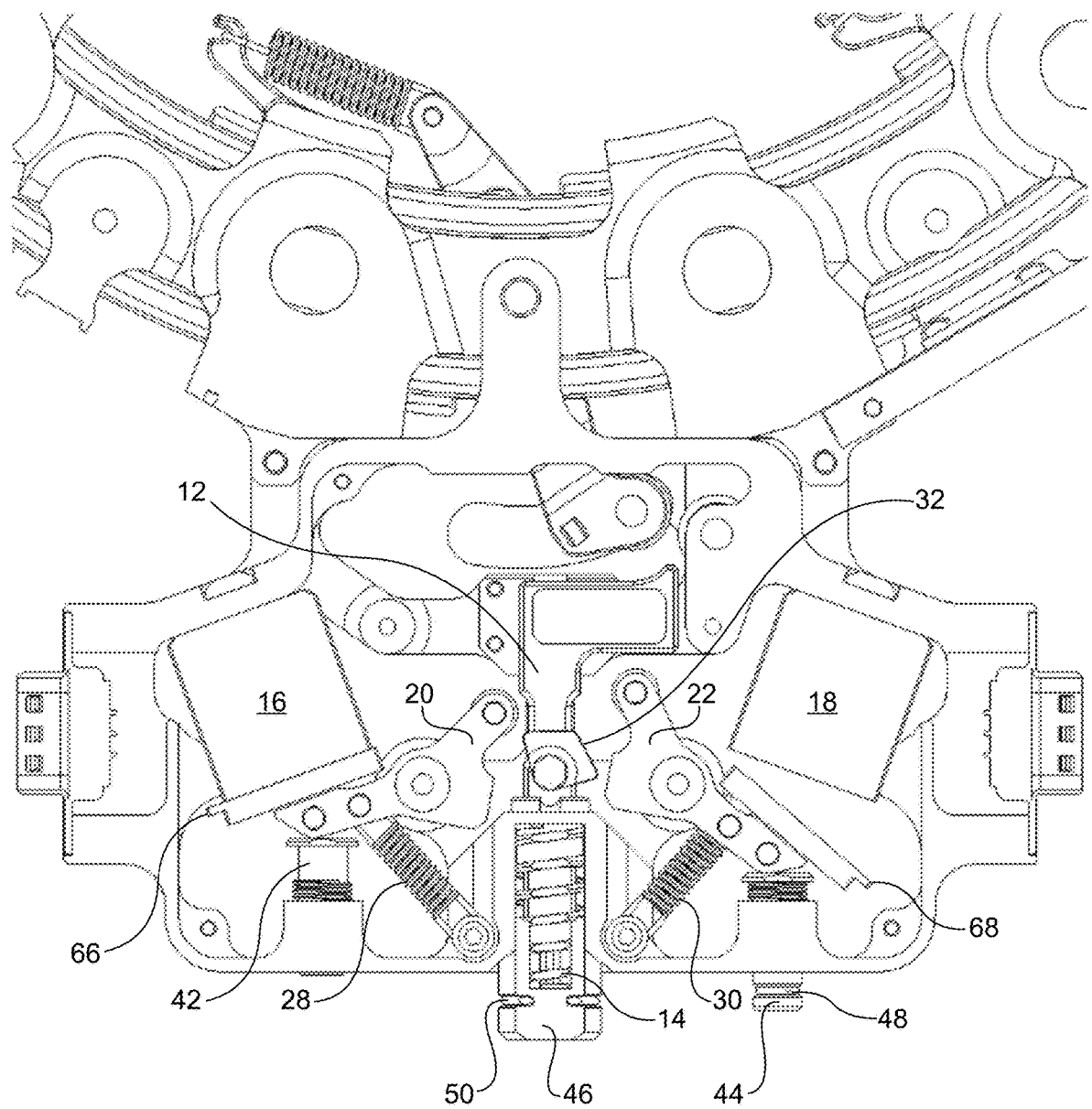
FIG. 4 the apparatus of FIG. 2 in another part sectional representation.

2 and FIG. 4), the indicator 44 has been pushed out of the housing 10 by the pivot lever 22 so that it can be seen from the outside that the pivot lever 22 is in a released position. At the same time, it is possible by actuating the indicator 4 to pivot the pivot lever 22 back against the force of its spring 30 so that said pivot lever 22 again contacts the magnet 18 with its holding plate 26 and is held by said magnet 18. The same functionality is available to the indicator 42.

Figure 5:
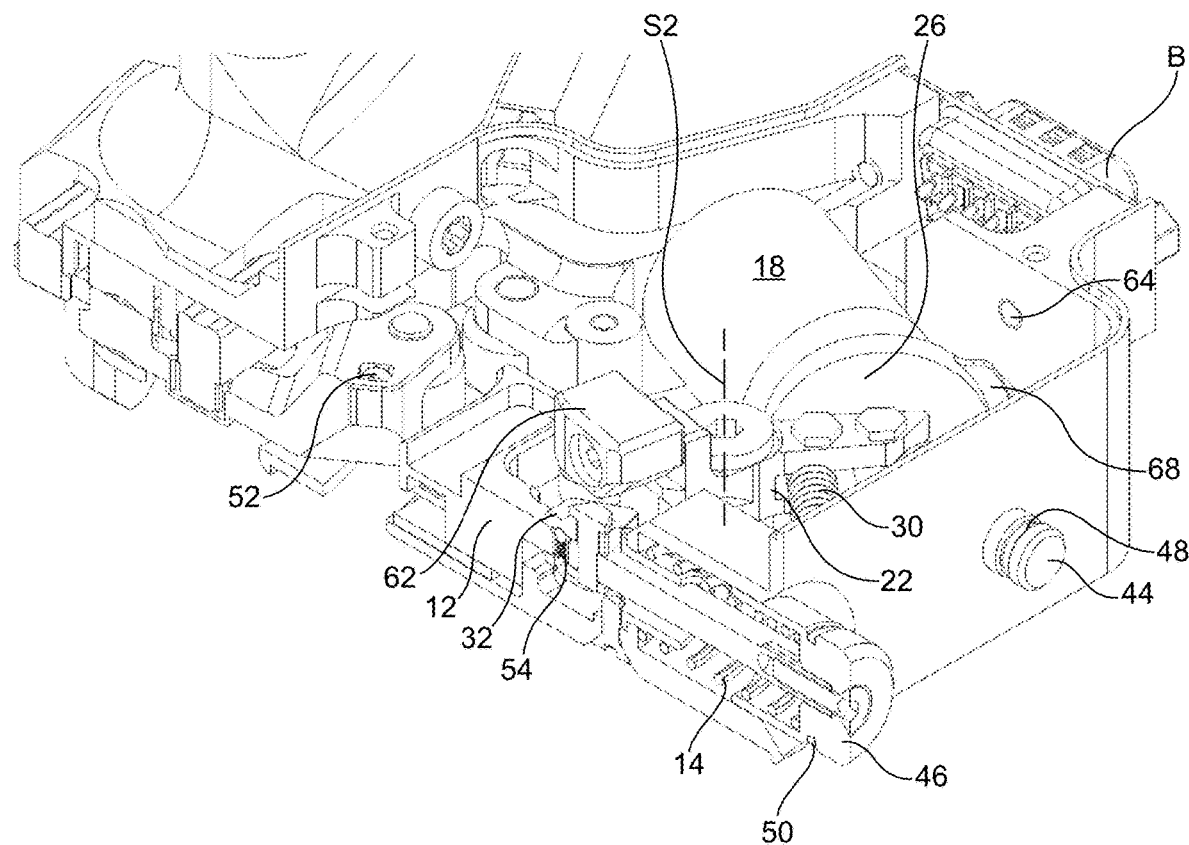
FIG. 5 a perspective partly sectioned representation of the release apparatus.

As in particular FIGS. 3 to 5 illustrate, the release spring 14 is accommodated in the indicator 46. Thus, the release spring 14 can be compressed by a pressure on the indicator 46, whereby the release plunger 12 moves linearly along its longitudinal axis L (to the left in FIG. 5), while one end of the release spring 14 contacts a wall fixed to the housing. A manual preloading of the release plunger 12 is hereby possible.

The operation of the above-described release apparatus will be explained in the following.

To bring the above-described release apparatus into a state ready for operation, the release plunger 12 first has to be moved into its preloaded position and held there. For this purpose, the indicator 46 is first pressed against the force of the release spring 14 from the position shown in FIG. 2 along the longitudinal axis L in the direction of the housing interior so that the release plunger 12 and the locking rocker 32 are approximately in the position shown in FIG. 1. Thereupon, the first indicator 42 and/or the second indicator 44 can likewise be pushed into the housing interior so that the pivot levers 20 and 22 are pivoted against the force of the springs 28 and 30 until the contact plates 24 and 26 contact the magnets 16 and 18 and are held by them. This position is reached when the markings 48 provided at the indicators 42 and 44 are no longer visible. In this state, the indicator 46 can be released so that the locking rocker 32 is uniformly held by the arms A2 of the pivot levers 20 and 22 from both sides. In this state, the marking 50 of the indicator 46 is also no longer visible and the release apparatus is in the state shown in FIG. 1 and FIG. 3.

For the release, an electrical release signal is transmitted via the electrical connectors A or B shown to the control electronics provided in the interior of the housing 10, whereupon the magnetic field of the magnet 16 or of the magnet 18 is weakened by an electrical coil or the like to such an extent that the associated contact plate 24, 26 detaches from the magnet and the associated pivot lever is pivoted by the spring 28 or 30. If, for example, the holding force of the magnet 18 is weakened, the contact plate 26 releases from the magnet 18 and the pivot lever 22 pivots clockwise about its pivot axis S2. A roller provided at the end of the short arm A2 of the pivot lever 22 hereby rolls off from the side of the locking rocker 32, whereby the release plunger 12 is no longer held in its position. Due to the force of the spring 14, the release plunger 12 is pulled downwardly along its longitudinal axis L (in FIGS. 1 and 3), whereupon the locking rocker 32 is likewise pivoted clockwise and the release plunger 12 moves into the position shown in FIG. 2 and FIG. 4. In this position, the pivot bolt 36 is no longer held so that it is pivoted counterclockwise by the force of the spring 34 until it is in the position shown in FIG. 2 and FIG. 4. In this position, the ejection unit, not shown in more detail, is unlocked and the satellite can be ejected (usually by the force of springs).

If the release by one of the two magnets is unsuccessful for any reason, the respective other magnet can be weakened in its magnetic field in order to still achieve a release.

To be able to check whether the apparatus has been properly released, a magnet 52 is installed in the pivot bolt 36 in the embodiment shown. If the pivot bolt 36 moves into the position shown in FIG. 2 and FIG. 4, the magnet 52 is located in the region of two reed sensors that are connected in parallel and that are arranged at an electronic circuit board, not shown, in the housing. A redundant monitoring of the release process can hereby take place. The two reed sensors only generate a switching signal, which can be evaluated and read out by the associated electronics, when the pivot bolt 36 is in the released position.

To prevent the locking rocker 32 from pivoting back on its own after the release process and thus blocking the release plunger under certain circumstances before a further locking, a latch device 54 (FIG. 5) is provided in the release plunger 12 and locks the locking rocker in its release position (FIG. 1 and FIG. 3) and in its released position (FIG. 2 and FIG. 4). For this purpose, a spring is accommodated in the release plunger 12 and applies a force to a ball that can engage into a respective recess of the locking rocker 32. Therefore, the locking rocker 32 has three defined latch positions in the embodiment shown.

As can be seen from the Figures, the magnets 16, 18 serving as release elements are not arranged in parallel, but at an acute angle to the longitudinal axis L of the release plunger 12. In the embodiment shown, the angle between a longitudinal axis of each magnet amounts to approximately 20° so that a very compact arrangement is achieved. At the same time, the arrangement is made such that the force exerted by the release spring 14 is transmitted from the locking rocker 32 to the pivot levers such that said force extends in the direction of the pivot axis S1 and S2 and is therefore absorbed by the associated shaft. Thus, no compulsory opening forces arise that would be transmitted to the contact plates 24 or 26.

To prevent a torque, which could generate undesirable opening forces, from being exerted on the pivot levers 20 and 22 in the event of impact-like vibrations, an additional weight 60, 62 is provided in the region of one arm of each two-arm pivot lever 20 and 22. The additional weights 60, 62 (which are not visible in FIG. 3 and FIG. 4 due to a different sectional representation) are screwed to the respective pivot lever (cf. FIG. 5) and serve to compensate forces occurring due to impulse-like shock loads such that the respective pivot lever does not hereby experience a torque. In this respect, it is particularly preferred that the mass and the position of the additional weight (relative to the pivot axis S1 or S2) are selected such that the center of gravity of each pivot lever 20, 22, including all the parts connected to said pivot lever 20, 22 such as the contact plates 24 and 26, lies in the region of a pivot axis S1 or S2 of said pivot lever 20, 22. The additional weights 60 and 62 thus serve as balance weights for the contact plates 24 and 26. Since the center of mass of each pivot lever is thus located in the region of the pivot axis S1 or S2 of said pivot lever, the pivot levers are not undesirably pivoted under impulse-like shock loads. Provided that no shock-like impact loads are to be expected, the above-described release apparatus described can naturally also be used without the additional weight. Such an embodiment is likewise and explicitly considered to be in accordance with the invention.

Due to the very small available installation space, a very voluminous additional weight or a large spacing from the pivot axis is not possible with the release apparatus shown. Therefore, it is preferred if the additional weight has a material having a high specific density, for example, tungsten or a tungsten alloy.

If a de-energized unlocking of the release mechanism is required for testing or other purposes, the contact plates 24 and 26 can also be manually decoupled from the magnets 16 and 18 without opening the housing 10. For this purpose, the housing has two lateral openings 64 (FIG. 5) through which a tool, for example a screwdriver, can be inserted from the outside to release the contact plates 24, 26 from the associated magnet 16, 18. To facilitate this, a respective tab 66, 68 is molded at the contact plates 24, 26 and facilitates the levering off of the contact plates 24, 26 from the magnets 16, 18.

What is claimed is:

1. A release apparatus for releasing a satellite, said release apparatus comprising:
a release plunger that is configured to be preloaded by a release spring and that is held in a preloaded position by two two-armed pivot levers pivotable about a respective pivot axis, wherein each two-armed pivot lever is configured to be held against a force of a spring in a holding position by a release element, wherein the release plunger is guided by a fixed roller that absorbs a force of a spring-loaded latch, and wherein the spring-loaded latch is in contact with the release plunger when the release plunger is in the preloaded position.

2. The apparatus in accordance with claim 1, wherein one arm of each two-armed pivot lever is provided with an additional weight.

3. The apparatus in accordance with claim 2, wherein the additional weight comprises tungsten.

4. The apparatus in accordance with claim 3, wherein the additional weight consists of one of tungsten and a tungsten alloy.

5. The apparatus in accordance with claim 1, wherein the two-armed pivot levers contact a locking rocker, which is fastened to the release plunger, in the holding position.

6. The apparatus in accordance with claim 5, wherein a latch device is provided that locks the locking rocker.

7. The apparatus in accordance with claim 6, wherein the latch device locks the locking rocker in a pivoted position.

8. The apparatus in accordance with claim 1, wherein said apparatus is arranged in a closed housing that is provided with a plurality of mechanical indicators that indicate a state of the release apparatus.

9. The apparatus in accordance with claim 8, wherein a first indicator of the plurality of mechanical indicators indicates a position of the release plunger and a second indicator of the plurality of mechanical indicators indicates a position of a two-armed pivot lever.

10. The apparatus in accordance with claim 8, wherein at least one of the plurality of mechanical indicators is configured as an actuation element.

11. The apparatus in accordance with claim 8, wherein the release spring is accommodated in one of the plurality of mechanical indicators.

12. The apparatus in accordance with claim 1, wherein, in the preloaded position, the release plunger is acted on by the spring-loaded latch transversely to a longitudinal axis of said release plunger.

13. The apparatus in accordance with claim 1, wherein a longitudinal axis of a release element encloses an angle of 15°-25° with a longitudinal axis of the release plunger.

14. The apparatus in accordance with claim 1, wherein said apparatus is arranged in a closed housing that has a length in parallel with a longitudinal axis of the release plunger and a width transverse to said longitudinal axis and transverse to the pivot axis, wherein the width is larger than the length.

15. The apparatus in accordance with claim 14, wherein the width is one and a half times to twice as large as the length.

16. The apparatus in accordance with claim 1, wherein said apparatus is arranged in a closed housing that has an opening configured to receive a tool to manually release a two-armed pivot lever from the release element.

17. The apparatus in accordance with claim 1, wherein the spring-loaded latch is configured to be transferred by the release plunger into a release position, wherein two sensors connected in parallel are provided, and wherein the two sensors are configured to detect the release position of the latch.

18. The apparatus in accordance with claim 17, wherein the two sensors are reed contacts.

19. The apparatus in accordance with claim 2, wherein a mass and a position of the additional weight are selected such that a center of gravity of each two-armed pivot lever lies in a region of a pivot axis of said two-armed pivot lever.

* * * * *